United States Patent
Shidlovsky

[15] 3,705,323
[45] Dec. 5, 1972

[54] CATHODOCHROMIC SODALITE AND CATHODE RAY TUBE EMPLOYING SAME

[72] Inventor: Igal Shidlovsky, Princeton, N.J.
[73] Assignee: RCA Corporation, New York, N.Y.
[22] Filed: Jan. 13, 1971
[21] Appl. No.: 106,036

[52] U.S. Cl. .................313/91, 252/300, 252/301.4
[51] Int. Cl. ..........................H01j 29/12, G03g 9/02
[58] Field of Search .........................252/300; 313/91

[56] References Cited

UNITED STATES PATENTS

| | | | |
|---|---|---|---|
| 3,598,750 | 8/1971 | Phillips | 252/300 |
| 3,253,497 | 5/1966 | Dreyer | 313/91 |
| 2,761,846 | 9/1956 | Medved | 252/301.4 |
| 2,752,521 | 6/1956 | Ivey | 313/91 |
| 2,504,674 | 4/1950 | Fonde | 117/33.5 |

OTHER PUBLICATIONS

Kirk, Journal of Electrochemical Society, 101, 9 pages 461–465, 1954.

Primary Examiner—George F. Lesmes
Assistant Examiner—J. P. Brammer
Attorney—G. H. Bruestle

[57] ABSTRACT

A cathodochromic cathode ray tube comprises an image screen employing improved cathodochromic sodalite. The cathodochromic sodalite is prepared by forming an amorphous mass from a mixture of a sodium halide, sodium hydroxide, aluminum oxide and silicon dioxide. The mass is calcined at an elevated temperature so as to drive out hydrated water from the mass. The calcined mass is crushed to a powder and then sintered so as to form crystalline sodalite. The temperature is raised from the initial sintering temperature to 1,000°C or more so as to cause a portion of the sodium halide in the sodalite to be evaporated therefrom thereby resulting in an non-stoichiometric crystal having vacancies in the positions which sodium and halide ions normally occupy in the crystal.

3 Claims, 1 Drawing Figure

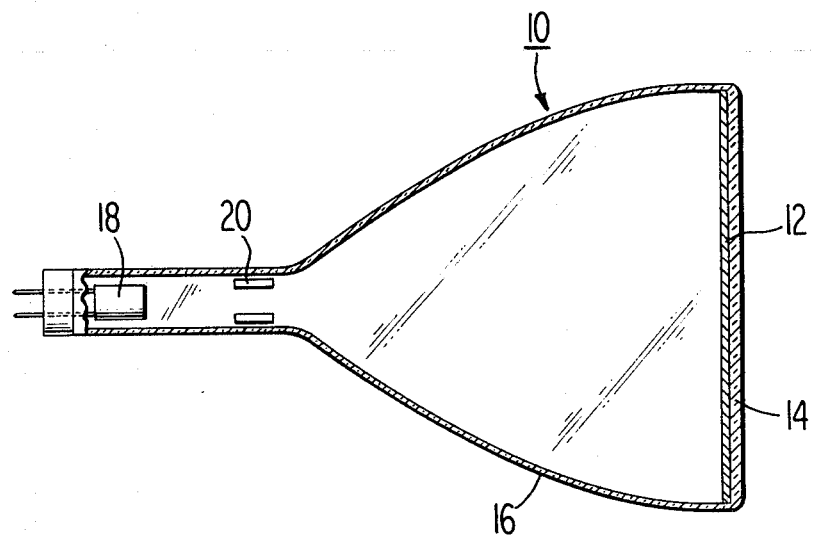

CATHODOCHROMIC SODALITE AND CATHODE RAY TUBE EMPLOYING SAME

BACKGROUND OF THE INVENTION

This invention relates to an improved sodalite particularly useful as a cathodochromic material for use in a cathode ray tube and to the method of preparation of this sodalite.

Sodalite is known to be a photochromic material as illustrated in U. S. Pat. No. 2,761,846 issued to David B. Medved. In addition, the use of sodalite as a cathodochromic material in a dark trace cathode ray tube is described in U. S. Pat. No. 2,752,521 issued to Henry F. Ivy. The term photochromic materials as used herein refers to materials which can be reversibly switched from one absorption state to another absorption state by means of light. The term cathodochromic material refers to materials which can be colored by means of electron beam bombardment which coloration can be removed by means of heat.

An important feature of any cathodochromic device such as a dark trace cathode ray tube is the contrast ratio and gray scale attainable. It is, of course, preferred to have as high a maximum obtainable contrast ratio as possible.

In the past, sodalite has been prepared mainly in an effort to enhance its photochromic properties and there was no realization of the fact that requirements for preparing sodalite having a high contrast ratio as a cathodochromic material is different than that for photochromic sodalite. Dark trace cathode ray tubes employing sodalite prepared by prior art techniques typically have maximum cathodochromic contrast ratios in the range of about 3:1 to 7:1. This limit in contrast ratio also limited the gray scale attainable in these tubes. I have discovered a method of preparing sodalite which has a cathodochromic contrast ratio in the neighborhood of at least 25 to 1 to over 30 to 1. While the cathodochromic contrast ratio of this sodalite is high, the photochromic contrast ratio attainable in this material is low, for example, in the neighborhood of 3 to 1.

SUMMARY OF THE INVENTION

Cathodochromic sodalite, which may be represented by the general formula, $Na_6Al_6Si_6O_{24}(2-y)NaX$ where X is a halogen and y is a number from zero to 1.5 is prepared by mixing sodium halide, sodium hydroxide, aluminum oxide and silicon dioxide with water in an amount which is in excess of that required to dissolve all the sodium salts to form a slurry. The slurry is heated while mixing to evaporate the water and to form a solid homogeneous material. This material when examined under x-ray is amorphous in nature. The amorphous material is calcined to remove waters of hydration. The calcined material is sintered to form sodalite. Finally, the sintering temperature is raised to a temperature of from between 1,000° to 1,100°C so as to cause some of the sodium halide present in the crystal to be evaporated therefrom thereby leaving vacancies in the crystal lattice.

The sodalite may be doped for example with sulphur, iron, or other dopants by introducing the dopants into the mass during the initial mixing step.

An especially high contrast ratio cathodochromic dark trace cathode ray tube is obtained by utilizing sodalite having the above stated formula wherein y is from 0.6 to 1.2.

BRIEF DESCRIPTION OF THE DRAWINGS

The FIGURE is a cross-sectional view of a cathode ray tube having a cathodochromic sodalite image screen.

DETAILED DESCRIPTION OF THE INVENTION

Referring to the FIGURE, the cathode ray tube 10 is shown having a cathodochromic image screen 12. In this tube 10 the cathodochromic screen 12 is supported by an optically transparent face plate 14. The screen 12 comprises a finely divided powdered cathodochromic sodalite which may be represented by the general formula $Na_6Al_6Si_6O_{24}(2-y)NaX$, where: X is either chlorine, bromine or iodine or a mixture of any of these halides and wherein y is from 0.6 to 1.2. The novel cathodochromic sodalite may also contain impurities doped therein, such as iron and sulfur and is preferably dispersed in a binder. The cathodochromic screen 12 is enclosed in an evacuated envelope 16 of which the face plate 14 is a part. An electron gun assembly 18 and an electron beam deflecting means 20 are disposed within the envelope for projecting an electron beam onto the screen. Bombardment of the cathodochromic screen by the electron beam causes coloration of the screen. This coloration can be rapidly erased by heating the cathodochromic sodalite to a temperature of about 200°C or more.

The particular color of the image screen which appears due to electron bombardment thereof depends upon the particular halide or mixture of halides employed in the sodalite. While contrast ratios of a novel screen are typically above 10 to 1, contrast ratios of over 30 to 1 can be achieved when the halogen is bromine. The sensitivity of a novel sodalite screen wherein the halogen is bromine is also quite high. The term sensitivity as used herein is defined as the total charge per square inch that is necessary to obtain a contrast ratio of 10 on a settled layer of sodalite containing approximately 4 mgs of sodalite powder per square centimeter. Typically, the sensitivity of the novel bromine type sodalite is 120 microcoulombs per square inch to obtain a contrast ratio of 10. The high contrast ratios of the novel cathodochromic cathode ray tubes allows for a greatly improved gray scale.

A feature of the novel cathodochromic tubes is the fact that the cathodochromic sodalite contains from 30 – 60 percent sodium halide vacancies. Prior art sodalite, as previously stated, was primarily photochromic in nature and this sodalite had little if any sodium halide vacancies therein. For example, in a typical prior art sodalite, y of the above formula is typically between 0 and 0.1. Only a very small percentage of the total coloration produced by electron beam bombardment of the novel sodalite is due to photochromic type behavior. For example, where the sodalite has a total cathodochromic contrast ratio of 30:1, it is only reduced to 27:1 or 28:1 by means of light. Bleaching of the remainder of the coloration must be accomplished by heating the sodalite. Significant bleaching first occurs at temperatures of 200°C or more.

The screen of the cathodochromic tube can be prepared by standard powder settling techniques as is known in the art. For example, reference may be made to U.S. Pat. No. 2,817,599.

The novel cathodochromic sodalite is made by a novel process. The novel process differs from prior art processes for the preparation of sodalite in two main features. One feature of the novel process is the formation of a homogeneous mass which is amorphous when examined under x-rays as the first essential step in the preparation. The second feature of the novel process is the heating of the sodalite at a temperature of between 1,000° to 1,100°C for a period of time sufficient to cause from 30 – 60 percent sodium halide vacancies in the crystal. That is, to cause from 30–60 percent of the sodium halide to be evaporated from the crystal lattice such that $y$ of the formula is from 0.6 to 1.2. Both of the above steps are important in obtaining the very high contrast ratio cathodochromic sodalite which is useful in the cathodochromic cathode ray tube of the invention.

In general, the novel technique for preparation of cathodochromic sodalite comprises the steps of mixing stoichiometric quantities of a sodium halide, sodium hydroxide, aluminum oxide and silicon dioxide with water in an amount which is in excess of that required to dissolve the sodium halide and sodium hydroxide. During this dissolution and subsequent heating to evaporate the water, a portion of the aluminum oxide is converted to sodium aluminate and a portion of the silicon dioxide is converted to sodium silicate. It is preferred that the aluminum oxide and silicon dioxide be in the form of finely divided powder, for example, powder having a particle size of less than 10 microns. These materials may be dry or hydrated. The slurry formed from this mixture is then placed on a hot plate and heated while being continuously stirred so as to evaporate the water and form a homogeneous solid mass. When the slurry starts to solidify, stirring is stopped and it is placed in a drying oven at 110°C to evaporate the remainder of the water. The resultant homogeneous mass formed thereby is amorphous as shown by x-ray diffraction techniques. This amorphous mass is then calcined. Typical calcining temperatures are from 300°–600°C for 2–30 hours. The particular time for calcining is, of course, a function of the temperature employed and the quantity of material being calcined. The function of the calcining step is to remove hydrated water from the mass. The calcined mass is then comminuted to form a powder which is then sintered so as to form crystalline sodalite. Typical sintering temperatures are in the range of 700°–1,000°C for from 5 hours to several days. As in the calcining step, the sintering time is dependent upon the sintering temperature and the amount of material being sintered. It is preferred to sinter slowly starting at a low temperature and slowly raising the temperature. Finally, the material is heated to a temperature of from 1,000°–1,100°C from 2–30 hours so as to evaporate sodium halide from the crystal and thus create crystal defects by virtue of the vacancies caused by the evaporation of the sodium halide. Further sintering may also take place during this step together with the evaporation of sodium halide. It is preferred not to go above 1,100° C as other phases with no or poor cathodochromic properties may be produced. Optimum cathodochromic material is obtained when from 30–60 percent of the sodium halide originally present in the crystal is evaporated therefrom. The final crystal structure of the cathodochromic material prepared by the above technique is body centered cubic and the crystals generally have a random size and shape. One of the unique features of the novel process is the formation of the amorphous mass which is then calcined and sintered. This step has been found necessary to obtain the optimum results i.e. materials having extremely high cathodochromic contrast ratios.

EXAMPLE 1

6.853 grams NaBr, 7.993 grams NaOH, 10.184 grams $Al_2O_3$, 16.000 grams $SiO_2 \cdot xH_2O$ (about 25 percent $H_2O$), are mixed with 150 ml of water. The sodium hydroxide and sodium bromide are dissolved in the water. The resultant slurry is placed on a hot plate while constantly mixing so as to evaporate the water. When the slurry starts to solidify, it is transferred to an oven at 110°C to dry. The dry amorphous mass formed thereby is then comminuted to form a powder which is placed in a platinum container. The amorphous powder is then calcined at 400°C for 5 hours. The mass formed during calcining is then comminuted to form a powder and placed in a platinum container and initially sintered by heating at 700°C for 3 days.

Sintering is continued after first comminuting the initially sintered mass and heating the resultant powder at 900°C for 1 day. The sintered mass thus formed, which consists of crystalline sodalite where $y$ of the formula is at or about zero is comminuted and the resultant powder is heated at 1,000°C for one day. The resultant mass which is comminuted before use in an image screen is crystalline sodalite having a unit cell of 8.747 A and a NaBr vacancy of about 50 percent. When used as a cathodochromic screen, this material shows a contrast ratio between the colored and uncolored states of about 30:1.

EXAMPLE 2

$Na_6Al_6Si_6O_{24}(2-y)NaCl$ is prepared in the following manner. A water slurry containing 12.000 grams $SiO_2$, 10.176 grams $Al_2O_3$, 7.992 grams NaOH, and 3.88 grams NaCl in 150 milliliters of water is prepared. The sodium hydroxide and sodium chloride are dissolved in the water. The slurry is evaporated while mixing until it starts to solidify. The solidified mass is transferred to an oven at about 110°C to dry. A dry homogeneous amorphous mass is formed. This mass is held overnight at 150°C to insure drying. Thereafter, it is comminuted and calcined for 6 hours at 400°C.

The comminuted mass is sintered to form sodalite in two steps. The first step comprises heating overnight at 700°C and then heating for 2 hours at 900°C. The material is comminuted between each heating step. A final heat treatment for 10 hours at 1,000°C is carried out during which time approximately 40 percent of the sodium chloride is vaporized from the crystalline sodalite. The powder formed from the resulting mass exhibited a saturation contrast ratio of 13:1.

EXAMPLE 3

Undoped $Na_6Al_6Si_6O_{24}(2-y)NaBr$ having a saturation contrast ratio of about 35:1 is prepared in the following manner. An amorphous mass is formed as described above from a slurry containing 7.196 grams NaBr, 7.99 grams NaOH, 10.184 grams $Al_2O_3$, 14.600 grams $SiO_2 \cdot xH_2O$ (12.000 grams $SiO_2$) and 150 milliliters of water. The amorphous mass is then treated as described in Example 2. The resulting bromide type sodalite has a sodium bromide vacancy of about 45 percent.

The percent of sodium halide vacancy in sodalite is determined by the weight loss of the material after the final heat treatment.

What I claim is:

1. In a dark trace cathode ray tube which comprises an envelope, a cathodochromic image screen in said envelope and electron beam producing means, the improvement which comprises a cathodochromic image screen consisting essentially of sodalite of the formula $Na_6Al_6Sib6O_{24}(2-y)NaX$ wherein X is chlorine, bromine or iodine and y is an integer from 0.6 to 1.2 which has a high cathodochromic contrast ratio prepared by a process which comprises mixing essentially stoichiometric quantities of sodium hydroxide, sodium halide, aluminum oxide and silicon dioxide with water in an amount in excess of that required to dissolve said sodium hydroxide and sodium halide to form a slurry, heating and mixing said slurry to obtain an essentially homogeneous amorphous material, calcining said amorphous material to remove water of hydration, sintering the resultant calcined material initially at temperatures under 1,000°C to form crystalline sodalite, and heating said crystalline sodalite to between 1000°C and 1,100°C to evaporate sodium halide from said crystalline sodalite.

2. A tube according to claim 1 wherein the halogen is bromine.

3. A tube according to claim 1 wherein said sodalite is doped with at least one dopant selected from the group consisting of iron and sulphur.

* * * * *